United States Patent
Kirchner et al.

(10) Patent No.: US 11,786,345 B2
(45) Date of Patent: Oct. 17, 2023

(54) METHOD OF MAKING A PHYSICAL OBJECT

(71) Applicant: 3M INNOVATIVE PROPERTIES COMPANY, St. Paul, MN (US)

(72) Inventors: Bastian P. Kirchner, Fürstenfeldbruck (DE); Gioacchino Raia, Türkenfeld (DE); Anja Friedrich, Munich (DE); Daniel D. Oberpertinger, Herrsching (DE); Malte Korten, Moorenweis (DE); Andreas G. Herrmann, Munich (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 138 days.

(21) Appl. No.: 16/764,917

(22) PCT Filed: Nov. 13, 2018

(86) PCT No.: PCT/IB2018/058930
§ 371 (c)(1),
(2) Date: May 18, 2020

(87) PCT Pub. No.: WO2019/102304
PCT Pub. Date: May 31, 2019

(65) Prior Publication Data
US 2020/0337813 A1    Oct. 29, 2020

(30) Foreign Application Priority Data
Nov. 21, 2017    (EP) ..................................... 17202706

(51) Int. Cl.
*A61C 13/00*    (2006.01)
*B33Y 10/00*    (2015.01)
(Continued)

(52) U.S. Cl.
CPC ............ *A61C 13/0013* (2013.01); *A61C 5/77* (2017.02); *A61C 13/0019* (2013.01);
(Continued)

(58) Field of Classification Search
CPC ......... B33Y 10/00; B33Y 30/00; B33Y 80/00; B33Y 40/20; B29C 64/124; B29C 64/129;
(Continued)

(56) References Cited

U.S. PATENT DOCUMENTS 5,901,593 A    5/1999    Fritz
6,482,576 B1    11/2002    Farnworth
(Continued)

FOREIGN PATENT DOCUMENTS

CN    103934940    2/2017
DE    19936931    2/2001
(Continued)

OTHER PUBLICATIONS

Dentsply, "Directions of Use Airblock", 2009, 13 pages.
(Continued)

*Primary Examiner* — Joseph S Del Sole
*Assistant Examiner* — Jamel M Nelson

(57) ABSTRACT

A method of making a physical object by additive manufacturing. The method has the steps of providing a light hardenable primary material (11), building up the object (100) by successively hardening portions of the light hardenable primary material (11) by irradiating the portions with light, coating at least a part of the object (100) with a light permeable coating or oxygen protective material; and irradiating the coated object (100) with light and thereby post-hardening any light hardenable material (11).

12 Claims, 6 Drawing Sheets

(51) Int. Cl.
  *B33Y 30/00* (2015.01)
  *B33Y 80/00* (2015.01)
  *A61C 5/77* (2017.01)
  *B29C 64/35* (2017.01)
  *B29C 64/129* (2017.01)
  *B33Y 40/20* (2020.01)

(52) U.S. Cl.
  CPC ............ *B29C 64/129* (2017.08); *B29C 64/35* (2017.08); *B33Y 10/00* (2014.12); *B33Y 30/00* (2014.12); *B33Y 40/20* (2020.01); *B33Y 80/00* (2014.12)

(58) Field of Classification Search
  CPC ..... B29C 64/135; B29C 64/35; B29C 64/357; A61C 13/0013; A61C 13/0019
  See application file for complete search history.

(56) References Cited

U.S. PATENT DOCUMENTS

| | | | |
|---|---|---|---|
| 6,579,917 B1 | 6/2003 | Noguchi | |
| 2004/0148048 A1* | 7/2004 | Farnworth | ............ B29C 64/135 |
| | | | 382/141 |
| 2008/0169585 A1 | 7/2008 | Zinniel | |
| 2009/0283109 A1* | 11/2009 | Moussa | ..................... B08B 3/06 |
| | | | 134/1 |
| 2009/0283119 A1* | 11/2009 | Moussa | .................. B29C 64/35 |
| | | | 134/147 |
| 2014/0131908 A1* | 5/2014 | Sun | ........................ B33Y 80/00 |
| | | | 264/16 |

FOREIGN PATENT DOCUMENTS

| | | | |
|---|---|---|---|
| DE | 102006060720 | | 6/2008 |
| EP | 0420614 | | 4/1991 |
| JP | 62000005 | | 1/1987 |
| JP | S625 | A * | 1/1987 |
| JP | S625 | A | 1/1987 |
| JP | H6315986 | A | 11/1994 |
| JP | H760843 | A | 3/1995 |
| WO | WO 2000-067981 | | 11/2000 |
| WO | WO 2003-089218 | | 10/2003 |
| WO | 2009140449 | A2 | 11/2009 |
| WO | WO 2019-023120 | | 1/2019 |

OTHER PUBLICATIONS

Ivoclar Vivadent, "Liquid Strip Instructions for Use", 2003, 20 pages.

International Search report for PCT International Application No. PCT/IB2018/058930 dated Jan. 30, 2019, 6 pages.

* cited by examiner

METHOD OF MAKING A PHYSICAL OBJECT

FIELD OF THE INVENTION

The invention relates to a method of making a physical object by additive manufacturing, and in particular to a coating of the object with a light permeable coating, in particular an oxygen protective material and irradiating the coated object with light for post-hardening any light hardenable material.

BACKGROUND ART

In a variety of technical fields physical objects or mechanical workpieces are more and more manufactured by additive manufacturing processes.

Such additive manufacturing processes typically allow for building up an object in its desired individual shape by subsequently adding material to create that shape. So-called subtractive processes in which an object is machined from an oversized blank by removal of material are more and more replaced by additive manufacturing processes.

While additive manufacturing processes are meanwhile widely used in the industry for rapid prototyping, the manufacturing of final products in many areas is still challenging. In particular for making dental restorations it is generally required to use materials that are compatible for use in a human body. Further, a dental restoration manufactured by a build-up process must fulfill requirements to mechanical stability as well as expectations about aesthetics, for example concerning color shading and translucency.

Some additive manufacturing processes are based on stereolithography. Stereolithography generally uses light for hardening light hardenable or photopolymerizable resins. Data based on computer aided design and/or computer aided manufacturing (CAD/CAM) are used to project a light pattern on a layer of light hardenable resin. The photosensitive resin typically solidifies in consequence of the exposure of the light so that a layer of solidified resin according to the pattern is formed. A desired three-dimensional object is created by consecutively adding layers. Thereby the pattern is controlled according to the desired shape of the three-dimensional object.

Typically at the boundary between the object and the light hardenable material some of the light hardenable material resides on the object after building up the object. The light hardenable material typically resides on the object in varying amounts, depending for example on the viscosity of the light hardenable material. This excess material is generally undesired because it forms an additional structure on the actual shape of the object and because the light hardenable material often is sticky, may contain undesired monomers and/or may (as such) not form a durable structure. Therefore, currently such residual light hardenable material is often post-cured to provide the object with a solid surface. According to another approach the object is cleaned mechanically or with aid of chemical solutions and optionally post-cured after.

Although existing approaches for treating the excess material on objects that are made by additive manufacturing provide useful results, there is still a need for a method that provides objects with a precise and durable outer surface.

SUMMARY OF THE INVENTION

The invention relates to a method of making a physical object (further referred to as "object" herein) by additive manufacturing. The method comprises (the) steps of:

(a) providing a light hardenable primary material, wherein the light hardenable primary material is liquid or pasty;
(b) building up the object by successively hardening portions of the light hardenable primary material by irradiating the portions with light;
(c) coating at least a part of the object with a light permeable flowable coating; and
(d) irradiating the coated object with light and thereby post-hardening any light hardenable primary material.

In one alternative the invention relates to a method of making a physical object (further referred to as "object" herein) by additive manufacturing. The method comprises (the) steps of:

(a) providing a light hardenable primary material, wherein the light hardenable primary material is liquid or pasty;
(b) building up the object by successively hardening portions of the light hardenable primary material by irradiating the portions with light;
(c) providing the object in a reservoir containing a light permeable flowable coating; and
(d) irradiating the object within the reservoir with light and thereby post-hardening any light hardenable material.

The following disclosure applies for both alternatives of the invention, unless otherwise indicated.

The invention is advantageous in that it allows for providing objects that are built up by additive manufacturing with a minimized amount of non-hardened material at least at outer surfaces of the object. The coating as referred to herein may be an oxygen protective material. Therefore the term "coating" may be replaced by the term "oxygen protective material". The coating or oxygen protective material encloses or encapsulates non-hardened material and thereby protects the non-hardened material from access to oxygen. Therefore any oxygen inhibition of the light hardenable primary material can be minimized so that any non-hardened material can be post-hardened at maximized quality. Further the invention is advantageous in that it allows for extensively cleaning objects that are built up by additive manufacturing from undesired adherent non-hardened material and additionally from the oxygen protective material. Thereby the cleaning of the objects is noninvasive and contact-free. Accordingly the object is prevented from structural damages or mechanical failures, for example as those may be caused by cleaning tools or cleaning agents. Further, because the cleaning is based on physical action, the cleaning is generally independent from the chemical composition of the excess material or the coating. In particular, no solvents or cleaning agents for chemically cleaning are required (although a chemical cleaning step may be applied in addition). Therefore the invention can be used with a variety of light hardenable primary and secondary materials as well as coatings based on different chemical bases.

In one embodiment the coating is made of a composition comprising between 50% by weight and 99% by weight glycerol and between 1% by weight and 49% by weight fumed silica.

In one embodiment the method further comprises a (or the) step of cleaning the object from the coating by moving the object and thereby generating a mass inertial force in the coating. The step cleaning the object from the coating may be performed by other means. For example, the coating may be removed by washing the object with a cleaning agent and thereby removing the coating from the object.

In a further embodiment the method comprises a (or the) step of cleaning the object from excess material by moving the object and thereby generating a mass inertial force in the excess material. Excess material as referred to herein may be formed by at least one of the light hardenable primary material and a light hardenable secondary material. This means that the excess material may be formed by the light hardenable primary material, the light hardenable secondary material or by a combination of the light hardenable primary material and the light hardenable secondary material.

The step of cleaning the object from excess material is performed before the step of coating the at least a part of the object with a light permeable coating. (In the alternative the step of cleaning the object from excess material is performed before the step of providing the object in the reservoir.) Thus the amount of excess material is reduced or minimized. This helps providing the object at a maximized accuracy. Further, the excess material is formed by at least one of the light hardenable primary material and a light hardenable secondary material.

The term "light hardenable primary material" preferably refers to non-hardened material of the type of material used to build up the object. Further, the term "light hardenable secondary material" refers to a non-hardened material of a material that is different from the material from which the object is built up. The light hardenable secondary material may be applied to the built up object, for example coated on the built up object for finishing. The term "hardenable" as used herein may comprise or correspond to "polymerizable".

The light hardenable primary material and the light hardenable secondary material and thus also the excess material are preferably liquid or pasty. Accordingly, the light hardenable primary and secondary material and the excess material are also flowable. The light hardenable primary and secondary material may not be a powder. Further the coating is preferably liquid or pasty or a gel.

The term "mass inertial force" as referred to herein may be specified as force per unit mass and therefore may be specified in the unit $m/s^2$. Further, the mass inertial force can be expressed by the G-force which is a factor of the acceleration of gravity. For the purpose of the present specification the acceleration of gravity is 9.81 $m/s^2$. Consequently, for example a mass inertial force of 9.81 $m/s^2$ can be expressed as 1 G.

The excess material, as far as such excess material remains on the object, preferably forms part of the object. This means that although some of the excess material may be removed from the object by cleaning any residual part of the excess material on the object form part of the object.

The excess material may result from the particular type of additive manufacturing process used for making the physical object. For example the particular type of additive manufacturing process used for making the physical object may inherently result in light hardenable primary material to adhere at the object. Such adhering light hardenable primary material may for example be present in the form of a film on an outer surface of the object. The excess material may as one option be left entirely on the object and post-hardened after building up the object. In this case the step of cleaning the object from excess material is not performed. Before the excess material is post-hardened the physical object (including the excess material) may be exposed to a vacuum.

As another option the excess material may be at least partially removed by the step of cleaning the object from excess material. Because typically the cleaning step results in a removal of the excess material of at least about 95% of the initial amount of excess material the remaining excess material is preferably also post-hardened.

Disclosed is further a method of post-processing a physical object obtained from additive manufacturing. The method of post-processing comprises (the) steps of providing the object by additive manufacturing and exposing the physical object to vacuum. The method may further comprise the step of cleaning the object from excess material (as described in the present specification) by moving the object and thereby generating a mass inertial force in the excess material. The step of exposing the physical object to vacuum is preferably performed prior to the step of cleaning the object from excess material. Further the step of exposing the physical object to vacuum is preferably ended before or with the beginning of the step of cleaning the object from excess material. The step of exposing the physical object to vacuum may overlap with the step of cleaning the object from excess material but preferably ends before the end of cleaning the object from excess material. It has been found that the exposure of the excess material to vacuum causes air that is eventually trapped within the excess material to move toward the outer surface of the excess material. Further it has been found that any air arriving adjacent the excess material may form air bubbles which may cause irregularities at the outer surface of the excess material (for example as such and/or after bursting). In the step of cleaning the object from excess material, such outer surface of the excess material is preferably removed along with such irregularities. Therefore by the method of post-processing as disclosed herein a physical object can be provided which has a maximized surface smoothness.

For exposing the physical object to vacuum the physical object may be may be provided in a vacuum chamber. For example a centrifuge may have a vacuum chamber within which the application of vacuum and the centrifuging can be performed sequentially without handling the physical object between. As mentioned above the application of vacuum and the centrifuging may be performed partially simultaneously, but the vacuum should preferably be reduced or taken away toward the end of the step of cleaning the object from the coating to avoid the generation of surface irregularities.

The magnitude of the vacuum may be measured based on the absolute pressure. The absolute pressure is preferably less than 100 mbar, more preferably less than 20 mbar, most preferably less than 4 mbar. Although a lower absolute pressure typically provides better deaeration of the excess material, a greater absolute pressure (which still provides acceptable results) may be selected to achieve a faster processing and to maximize throughput in a manufacturing environment.

According to the invention at least some of the excess material and/or the coating is preferably caused to separate from the object in consequence of an acceleration force or mass inertial force acting on the adherent excess material and/or the coating. The acceleration force or mass inertial force is induced by moving, for example by rotating, the object. The wording "caused to separate from the object" in that regard covers that portions of the adhering excess material or the coating separate out of the excess material or the coating, respectively. Thus, the amount of excess material preferably reduces and the amount of the coating preferably reduces during the respective step of cleaning the object from the coating or from excess material. As mentioned a very thin and uniform film or particles of adhering light hardenable primary or secondary material typically remains after the step of cleaning the object from excess material. However, such remaining film is preferably post-cured. Further a very low amount of the coating may remain after the step of cleaning the object from excess material. The material that forms the coating is however preferably selected so that it can either remain on the object or such that it can be dissolved by a solvent that does not affect the object. A preferred solvent is water.

The additive manufacturing may be generally based on successively light hardening portions or layers of the light hardenable primary material. The additive manufacturing (or additive manufacturing process) may comprise at least one of Stereolithography (SLA), Multi Jet Modeling (MJM) and Film Transfer Imaging (FTI). All of these additive manufacturing processes typically use liquid and/or pasty light hardenable materials for building up objects.

Stereolithography (SLA) is typically based on hardening portions, in particular layers, of the light hardenable primary material by exposing selected portions of the light hardenable primary material by light. Stereolithography typically uses a positionable Laser light beam for selectively hardening portions of the light hardenable primary material. Further or alternatively a projector may be used as light source for selectively hardening portions of the light hardenable primary material. One projector based additive manufacturing process is generally referred to as Digital Light Processing™ (DLP). Stereolithography and projector based additive manufacturing processes (including DLP and others) are referred to herein as "Stereolithography", although in the field of additive manufacturing these processes may be understood to form alternatives.

In one embodiment the method of the invention is performed on a system for making a physical object by additive manufacturing. Accordingly the invention may additionally relate to a system that is configured for performing the method of the invention as disclosed herein. In particular, the system may comprise a device for additive manufacturing that is configured to perform at least the steps (a) and (b) of the method of invention. Further, the system may comprise a post-processing device that is configured to perform at least the steps (c) and (d) of the method of the invention. The device for additive manufacturing and the post-processing device may be configured to operate independently from each other (for example may form the system in the form of two separate devices) or may operate in combination (for example may form one device or system in combination).

Preferably the system has a vat for receiving light hardenable primary material and a build carrier for carrying the object. The build carrier forms a build surface. The build surface is preferably parallel to a support surface of the vat. The vat is preferably transparent or has at least a transparent bottom wall. The bottom wall preferably forms the support surface. The build surface and the support surface face toward each other. Further, the build surface preferably faces toward the center of gravity whereas the support surface faces in the opposite direction. The support surface supports a quantity of light hardenable primary material (if such material is present). The vat accordingly may have a circumferential side wall for retaining the light hardenable primary material in the vat. The vat and the build carrier are preferably movable relative to each other. The vat and the build carrier preferably can be positioned relative to each other by Computer Numerical Control (CNC). In more particular, the vat and the build carrier are preferably movable and positionable relative to each other in a dimension perpendicular to the support surface and the build surface. This dimension is further referred to as "build dimension" herein. The build dimension further corresponds to a dimension in which the object is successively built up.

The system may be generally based on any of the processes mentioned above. In a particular embodiment the system is based on DLP, in which a light source, in particular an image projector is arranged beneath the vat on the opposite side of the build carrier. In such a system the object is moved away from the center of gravity during the additive manufacturing. Further, the projector projects light in a direction away from the center of gravity. The image projector is particularly arranged to project light in the form of an image through the support surface toward the carrier. The light is preferably selected in accordance to a photoinitiator comprised in the light hardenable primary material. For example, in case an acyl phosphine oxide based photoinitiator like Irgacure® TPO is comprised in the light hardenable primary the image projector preferably emits at least UV light of a wavelength of between 340 nm to 430 nm. Irgacure® TPO typically has an absorption spectrum of between 350 nm and 420 nm with an absorption maximum of about 381 nm. The image projector may however be configured for emitting light at further wavelengths. For example the image projector may be adapted to emit blue light within of a wavelength of at least between 450 nm to 495 nm and/or white light of a wavelength range of 380 nm-750 nm.

An alternative system also has a vat for receiving light hardenable primary material and a build carrier for carrying the object. The build carrier forms a build surface which preferably faces away from the center of gravity. The support surface supports a quantity of light hardenable primary material (if such material is present). The vat has a circumferential side wall for retaining the light hardenable primary material in the vat. The vat and the build carrier are preferably movable relative to each other. The vat and the build carrier preferably can be positioned relative to each other by Computer Numerical Control (CNC). In more particular, the vat and the build carrier are preferably movable and positionable relative to each other in a dimension perpendicular to the build surface. The system may have a laser light source that is arranged above the vat. In such a system the object is moved toward the center of gravity during the additive manufacturing. Further, the laser light source projects light in a direction toward the center of gravity. The light is again preferably selected in accordance to a photoinitiator comprised in the light hardenable primary material as described above.

In an embodiment the step (b) of building up the object may comprise the step of providing a layer from the light hardenable primary material. Preferably the layer from the light hardenable primary material is formed between the build surface and the support surface. In case a layer of the light hardenable primary material has been previously hardened (as defined in step (b) of the method of the invention, the layer from the light hardenable primary material is formed between the hardened layer and the support surface. For forming the layer the light hardenable primary material may be provided in the vat and the build carrier and the vat may be positioned toward a determined position. Preferably the layer has a layer thickness along the build dimension. The distance between the build surface and the support surface corresponds to or forms the layer thickness. Once one or more layers of the object have been built up the layer thickness corresponds to the distance between the respective hardened layer and the support surface. The hardened layer that is located closest to the build surface is referred to as the bottom most hardened layer. The bottom most hardened layer has a surface that faces the support surface. Accordingly the layer from the light hardenable primary material is formed between the surface of the bottom most hardened layer and the support surface, in case the object is at least partially built up.

In a further embodiment the method comprises the step of hardening a volume element of the layer of light hardenable primary material. The volume element corresponds in thickness to the layer thickness. In particular the layer from light hardenable primary material may be exposed to light emitted from the image projector. The volume element that hardens typically corresponds in shape to an image projected by the image projector toward the layer from light hardenable primary material. For example a ring-shaped image projected by the image projector typically creates a ring of hardened primary material having a thickness corresponding to the layer thickness. The volume element forms a peripheral surface around the build dimension. This volume element is naturally in contact with light hardenable primary material. For example in case a ring-shaped volume element is created by the image projection, such a ring-shaped volume element forms a generally cylindrical peripheral surface that is in contact with light hardenable primary material (that was outside the image and thus not exposed to light).

In a further embodiment the method comprises the step of moving the volume element in the build dimension (in the dimension of the thickness). In particular, using Stereolithography, the volume element may be lowered to enable further light hardenable primary material to flow over the volume element, or—alternatively—the volume element may be lifted to enable further light hardenable primary material to flow beneath the volume element (in particular between the volume element and the support surface). Thus a further layer of light hardenable primary material is created.

The method may further comprise the step of hardening a further volume element. The further volume element is hardened within the further layer of light hardenable primary material.

The steps of hardening a volume element of the layer of light hardenable primary material, moving the volume element in the build dimension, and hardening a further volume element are preferably repeated until the object is built up.

In an embodiment the light hardenable secondary material is different from the light hardenable primary material. For example the light hardenable secondary material may be based on a chemical composition that is different from the chemical composition the light hardenable primary material is based on. In particular the light hardenable secondary material may have a color and/or a translucency that is different from the color and/or a translucency of the light hardenable primary material.

In an embodiment the light hardenable primary material is a photopolymerizable resin. Further the light hardenable secondary material may be a photopolymerizable resin. The hardening is preferably performed by irradiation of the light hardenable primary material and/or the light hardenable secondary material by light. The light may be or comprise UV light as specified herein, blue light or white light.

In one embodiment light hardenable primary material as well as the light hardenable secondary material are each based on a formulation comprising acyl phosphine oxide, in particular Irgacure® TPO as a photoinitiator. The light hardenable primary and second material may further be based on monomers with (meth)acrylate moieties as reactive groups and may contain fillers, dyes and colorants.

In an embodiment the mass inertial force applied for removing at least some of the excess material corresponds to a G-force of at least 100 G. A mass inertial force of 100 G has proven to be suitable to remove a mid to high viscous light hardenable material. The skilled person will recognize that the mass inertial force may be lower for lower viscous materials and higher for higher viscous materials. The mass inertial force can typically be adjusted by adjusting the rotation speed. For example the radius is typically determined by the size of the object and the configuration of the post-processing device, so that the mass inertial force can be adjusted by the rotation speed at which the object is moved. Preferably the cleaning of the object from excess material is performed with the object (including the excess material) being surrounded by air (in particular ambient air). This means that the excess material is in direct contact with air (in particular ambient air).

The cleaning of the object from the coating can be performed according to identical method steps as disclosed herein for the cleaning from the excess material. Eventually the rotation speed may be reduced in the cleaning of the object from the coating relative to the cleaning of the object from the excess material.

In an embodiment in the step of cleaning the object from the coating or from excess material, the moving of the object is a rotation of the object. Accordingly the mass inertial force may be generated by a centrifugal force. The centrifugal force on a particle of the excess material or the coating depends on the rotation speed and the radius at which that particle is located from the rotation axis. Accordingly excess material or the coating on an object having a non-uniform outer shape (like this is typically the case for dental restorations) is exposed to different centrifugal forces. It has however been found that a satisfying cleaning effect can be reached at a particular minimum rotation speed at least for a majority of outer surface portions of the object that are located offset from the rotation axis of the rotation of the object. Further, it has been found that for those outer surface portions of the object that are located closer to (or in) the rotation axis, the step of cleaning the object from the coating or from excess material may be performed by rotating the object about a different further rotation axis.

Accordingly the rotation is preferably performed about at least a first rotation axis and a second rotation axis. The first rotation axis and the second rotation axis have different orientations. Thus, the outside surface of an object built up by additive manufacturing can be effectively cleaned from excess material and the coating. The rotation of the object may be performed about a plurality of rotation axes or a rotation axis which can continuously incline in one, two or three dimensions. The embodiment in which the rotation axis can continuously incline in one, two or three dimensions may be achieved by a gimbal or Cardan suspension.

The rotation may be performed by a device that comprises a motor driven shaft on which the object can be received in two different orientations for a rotation about the first and/or the second rotation axis. In such a device the first and second rotation axis are typically extending through the object. Alternatively the rotation may be performed by a centrifuge in which the object may be retained at a rotor of the centrifuge. Different orientations of the object relative to the rotation axis can be adjusted by different rotation speeds of the centrifuge. This is because a centrifuge typically comprises one or more holders for receiving objects, and the holders are suspended at the rotor for pivoting radially outwardly from the rotation axis depending on the rotation speed of the centrifuge. In such a device the first and second rotation axis are typically extending outside the object.

In one embodiment the object comprises a workpiece for providing a dental restoration from the object. Preferably the object comprises the dental restoration. In particular the workpiece preferably forms the dental restoration. Accordingly the workpiece may correspond to the dental restoration from which any further structure of the object is removed after the object was built up and cleaned. The workpiece may thus comprise a tooth shape. For example, the workpiece may be a dental crown, a dental bridge or a dental inlay. The object further preferably comprises a fixture portion. The fixture portion preferably does not form part of the workpiece or dental restoration. Rather, the fixture portion may be configured for retaining the object in a post-processing device for cleaning the object from excess material and/or the coating. The object further may comprise one or more support structures that connect the workpiece and the fixture with each other. The support structures preferably also do not form part of the workpiece or dental restoration. Accordingly, to obtain the dental restoration the method may comprise the step of removing the support structures from the workpiece or dental restoration.

The object may further comprise two or more workpieces that are arranged via support structures to one common fixture. This allows for simultaneously building up several dental restorations and for performing the step of cleaning the object from the coating or from excess material on one object but several dental restorations at a time.

In a further aspect the invention relates to an object that is made of at least a light hardened material. The object comprises a preferably light permeable coating made of a composition comprising between 50% by weight and 99% by weight glycerol and between 1% by weight and 49% by weight fumed silica. Suitable compositions are available under the designation AirBlock™ from Dentsply Sirona Inc., Oxyguard II from Kuraray America Inc. or Liquid Strip® from Ivoclar Vivadent.

DETAILED DESCRIPTION OF THE INVENTION

Figure 1:
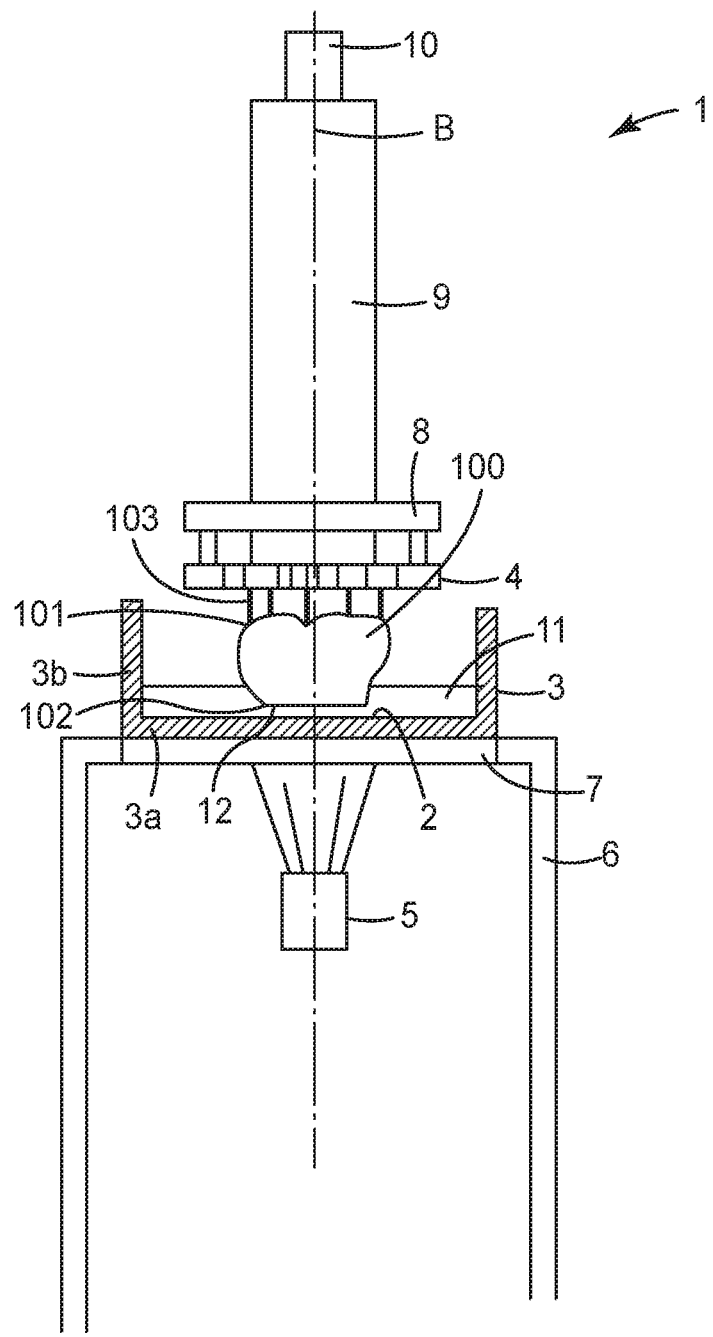
FIG. 1 is a schematic view of a device for additive manufacturing as it may be used with the present invention.

FIG. 1 shows a device 1 for making a physical object 100 by additive manufacturing according to the method of the invention. In the example the device 1 is used for building up a dental restoration. Accordingly the physical object 100 in the example is a dental restoration. Dental restorations comprise for example dental crowns, dental bridges, dental inlays or one or more replacement teeth.

The device 1 comprises a vat 3 in which a light hardenable primary material is provided. For providing the light hardenable primary material the device 1 may have one or more tanks (not illustrated) for storing the light hardenable primary material and means for dispensing portions of the light hardenable primary material into the vat 3. The light hardenable primary material may be selectively provided at different tooth colors, as desired. In the example the light hardenable primary material is a light hardenable resin (also generally referred to as photopolymerizable resin in the field of dental material practice). The light hardenable primary material has a liquid or pasty (and thus flowable) consistency. The vat 3 has a light permeable base 2. In the example, the overall vat 3 is made of a transparent material. Suitable materials for the vat 3 include, for example, silica glass or polycarbonate. Other materials are possible as appropriate.

The vat 3 is generally cup-shaped. In particular, the vat 3 has a bottom wall 3a, a side wall 3b and forms an opening opposite of the bottom wall 3a. The vat 3 in the example is generally circular (has a circular side wall), although other geometries are possible.

The device 1 is generally configured to build up an object 100 by Stereolithography. This means that the physical object is built up by successively hardening portions, in particular layers, of the light hardenable primary material. Accordingly each built up layer consists of hardened primary material. The hardened primary material is solid (and not flowable). The dimension in which the layers are "stacked" or provided onto each other is referred to herein as "build dimension" and is designated as "B" in the Figure. The shape in the remaining two dimensions is controlled by the shape of each of the layers of hardened primary material.

The shape of the individual layers of hardened primary material is determined by exposure of selected portions of a layer of light hardenable primary material. This is performed by a light source 5, which in the example is an image projector. The image projector is controlled (in particular provided with images) by a computer based on a three-dimensional virtual object that is virtually sliced in layers of a desired thickness. The image projector may be based on Digital Light Processing™. Digital Light Processing (DLP) uses micro-mirrors arranged in a matrix on a semiconductor chip. Such semiconductor chips are known as Digital Micro-mirror Devices ("DMD"). Typical mirrors of a DMD have a size of about 5 μm or less. Each of the mirrors are movable between two positions by control of the semiconductor. In the one position the mirror is positioned to reflect light directed on the mirror through the light output, whereas in the other position the mirror is positioned so that the light directed on the mirror does not exit the projector. Each mirror typically represents one pixel in the projected image so that the number of mirrors typically corresponds to the resolution of the projected image. The skilled person will recognize that other projector techniques or a laser beam may be likewise used with the device of the invention.

The light source 5 is arranged beneath a light permeable area 7 of the device 1. The light permeable area 7 is arranged generally horizontal (perpendicular to the direction of the force of gravity) and the light source 5 is arranged of that side of the light permeable area 7 that faces toward the center of gravity. In the example, the light permeable area 7 is provided in a housing 6 of the device. The vat 3 is removably placed with the light permeable base 2 on the light permeable area 7. Therefore, light emitted by the light source 5 and transmitted through the light permeable area 7 of the housing 6 is also transmitted through the light permeable base 2 of the vat 3. Further, because the vat 3 is removably placed in the device 1, the vat 3 can be replaced by another vat, for example a vat for use with a differently colored light hardenable primary material.

It is preferred that the light permeable area 7 and the light permeable base 2 are transparent and clear. Thus, the image sharpness of the image projected to the light permeable base can be maximized. This is also a basis for building up the object at maximized accuracy. It is noted that in another example the light permeable area and the light permeable base may be combined in one piece.

The device 1 comprises a build carrier 4. The build carrier 4 is arranged on that side of the light permeable area 7 opposite of the light source 5. The build carrier 4 is configured to hold the object built up by the device. The build carrier 4 can be positioned relative to the light permeable base 2 (and the light permeable area 7) by computer control. In particular, the build carrier 4 is movable at least in the build dimension B. In another example the build carrier may be movable in one or two dimensions perpendicular to the build dimension.

The object 100 is build up in the device 1 in the build dimension B. In particular the build-up process is performed downwards (in the direction of the force of gravity) in relation to a portion or layer of the object created first. This is achieved in that the device 1 pulls the object 100 successively upwards (away from the center of gravity and away from the light permeable area 7) as the object 100 is built up.

The build carrier 4 is connected to a linear drive 9 via a support 8. The linear drive 9 in the example has a spindle (not shown) which is mechanically coupled to the support 8 such that the support 8 can be moved in two directions in the build dimension B. The linear drive 9 further has a motor 10 and a position measuring device. Thus, the support 8 and the attached build carrier 4 can be accurately positioned by control of the device 1 via Computer Numerical Control (CNC). The skilled person will recognize that the support can be itself configured as build carrier in another example. Further the skilled person will recognize that the build carrier may be connected by other means with the linear drive. In addition other drives than a spindle drive are possible.

At the illustrated stage the object 100 (comprising a dental crown, in the example) is already partially built up in the device 1. Generally, the object 100 is build up in a region between the build carrier 4 and the light permeable base 2. In particular, the object 100 is carried via support structures 103 at a first end 101 of the object 100 by the build carrier 4. The build carrier 4 at the stage shown is positioned such that a space 12 is formed between an opposite second end 102 of the object 100 and the light permeable base 2. The space 12 has a pre-determined thickness in the build dimension B. Further, a light hardenable primary material 11 is provided in the vat 3. The amount of the light hardenable primary material 11 is selected such that a bath from light hardenable primary material of a pre-determined fill level is formed. The fill level of the light hardenable primary material 11 corresponds to or is higher than the thickness of the space 12. Accordingly, the space 12 is entirely filled with the light hardenable primary material 11. At this stage the image projector 5 can be used to emit light through the light permeable base 2 into the space 12. The light is preferably emitted in the form of a two-dimensional pattern in a plane parallel to the light permeable base 2. Accordingly, the light hardenable primary material 11 is irradiated locally in accordance to the pattern of the light pattern. In particular, any light pixel of the pattern causes such portions of the light hardenable primary material 11 to harden which are exposed to the light of the light pixel. The light hardenable primary material 11 is typically light permeable to a certain extent so that the light penetrates entirely through the light hardenable primary material 11 in the space 12. Therefore, by hardening of the light hardenable primary material, portions (in particular layers) of hardened primary material are created. These portions of hardened primary material connect with the object 100 as far as already built up and become part of a more complemented object. From this stage the complemented object can be retracted from the light permeable base 2 so as to create a new space filled with not yet hardened light hardenable primary material which can be irradiated by a further light pattern to further complement the object, and so on, until the object is built up layer by layer completely. The build carrier 4 has a retention surface that faces the light permeable area 7 and at which the object 100 adheres. The retention surface provides for a retention of the hardened primary material. The retention of the hardened primary material is better than the retention of the hardened primary material on the light permeable base 2. Thus, upon puling the object away from the light permeable base, the object stays retained at the build carrier while it disconnects from the light permeable base. The skilled person will recognize several technical possibilities of controlling the better adhesion of the hardened primary material at the build carrier, including the selection of materials for the build carrier 4 and the light permeable base 2, the configuration of the surface roughness of the build carrier 4 and the light permeable base 2, the arrangement of retention elements, or a combination thereof. The light permeable base 2 is optionally coated with a non-stick coating, for example a polytetrafluorethylene. Thus, the hardened primary material loosens from the light permeable base while the hardened portions adhere to each other. Therefore, any breaking apart of the built up object during retraction can be prevented.

During retraction of the object light hardenable primary material in the vat is—by nature of physics—sucked (or pressed by the ambient pressure) in to the emerging space. To prevent the fill level from dropping below the thickness of the space (which could cause a void in the object) further of the light hardenable primary material is provided in the vat prior to and/or simultaneously with retraction of the object.

After building up the object 100, excess (liquid or pasty) light hardenable primary material that adheres to the object is desirably removed. Excess light hardenable primary material may adhere to the object because light hardenable primary material from which the object is successively pulled out from typically does not run off entirely. Although such adhering excess light hardenable primary material may be hardened (post-cured) to save any cleaning step it has been found that the adhering light hardenable primary material may not form a uniform layer. Accordingly, adhering excess light hardenable primary material may negatively affect the accuracy of the shape of the object.

After cleaning the object 100 from the excess material, the object 100 is removed from the device 1 and coated by a light permeable coating, which in the example is a glycerol-based gel. The coating in the example is performed by immersing the object 100 into a reservoir holding an amount glycerol-based gel. Other ways of coating are possible. For example the coating may be sprayed or poured over the object. The coated object 100 is irradiated by light for hardening any light hardenable primary and/or secondary material. Subsequently, the coating is removed again as described in further detail below.

Figure 2:
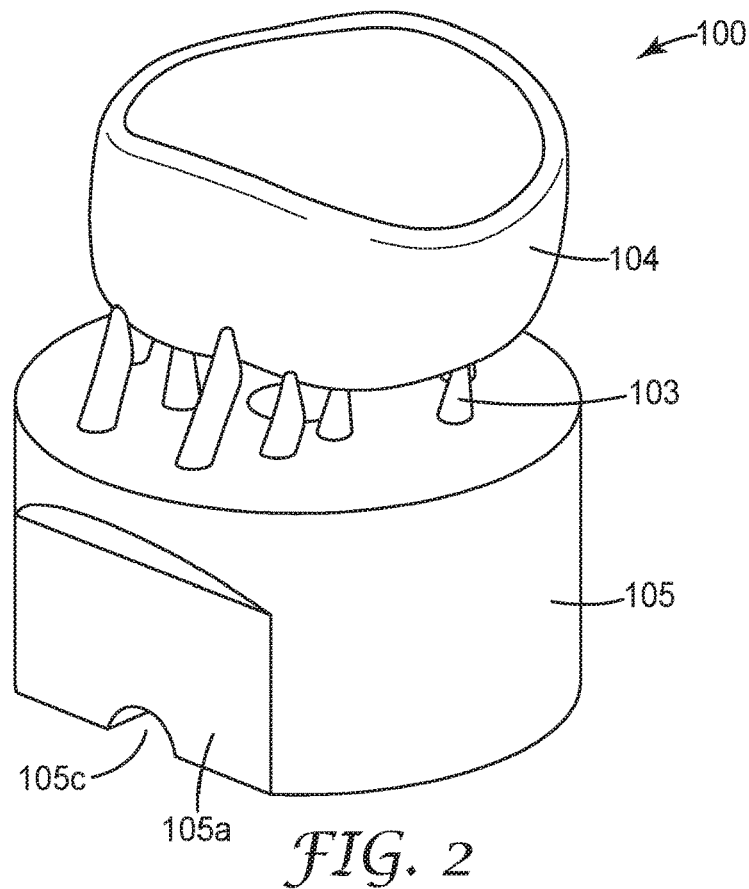
FIG. 2 is a perspective view of an object that may be made using the method of the invention.
Figure 3:
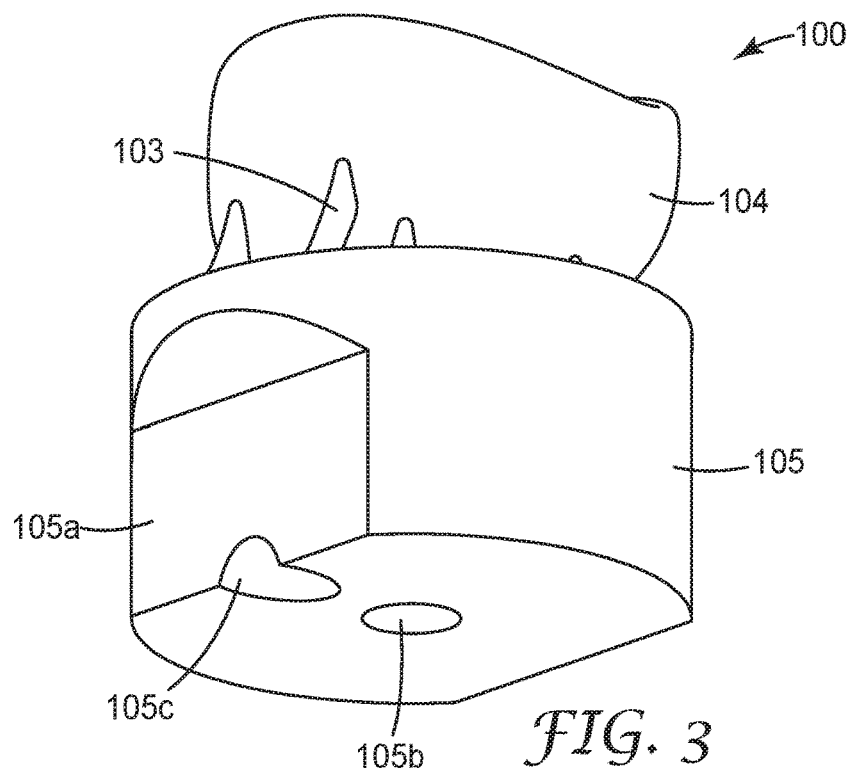
FIG. 3 is a different perspective view of the object shown in FIG. 2.

FIGS. 2 and 3 shows an object 100 that is built up in a device as described in FIG. 2. The object 100 comprises a workpiece 104—in the example is a dental crown—which is connected via support structures 103 to a fixture portion 105. The workpiece 104, the support structure 103 and the fixture portion 105 are built up from light hardened primary material. The fixture portion 105 allows handling and reproducible positioning of the object 100 in any so-called post-processing steps. However, the fixture portion 105 and the support structures 103 form so-called lost parts, meaning parts that are used for manufacturing only and removed from the workpiece 104 after. A post-processing step may include cleaning, post-curing, cutting, grinding and/or removing of the support structures 103 from the workpiece 104 (dental crown), for example. In the example, the fixture portion 105 has a flat 105*a* that allows for reproducible positioning of the object 100 at a predetermined angular position. Further, a first and a second cavity 105*b*, 105*c* are provided in the fixture portion 105. The first and second cavity 105*b*, 105*c* (see FIG. 3) allow for mounting the object 100 on a motor driven spindle as further described in more detail below. The skilled person will be able to provide other structures that allow for positioning of the object in a post-processing device. Examples include, a thread, dovetail structure, a part of bayonet lock and other structures as appropriate. After cleaning (and optionally further finishing) any support structures 103 are removed, for example by breaking away from the object 100 for obtaining the workpiece or the dental restoration.

Figure 4:
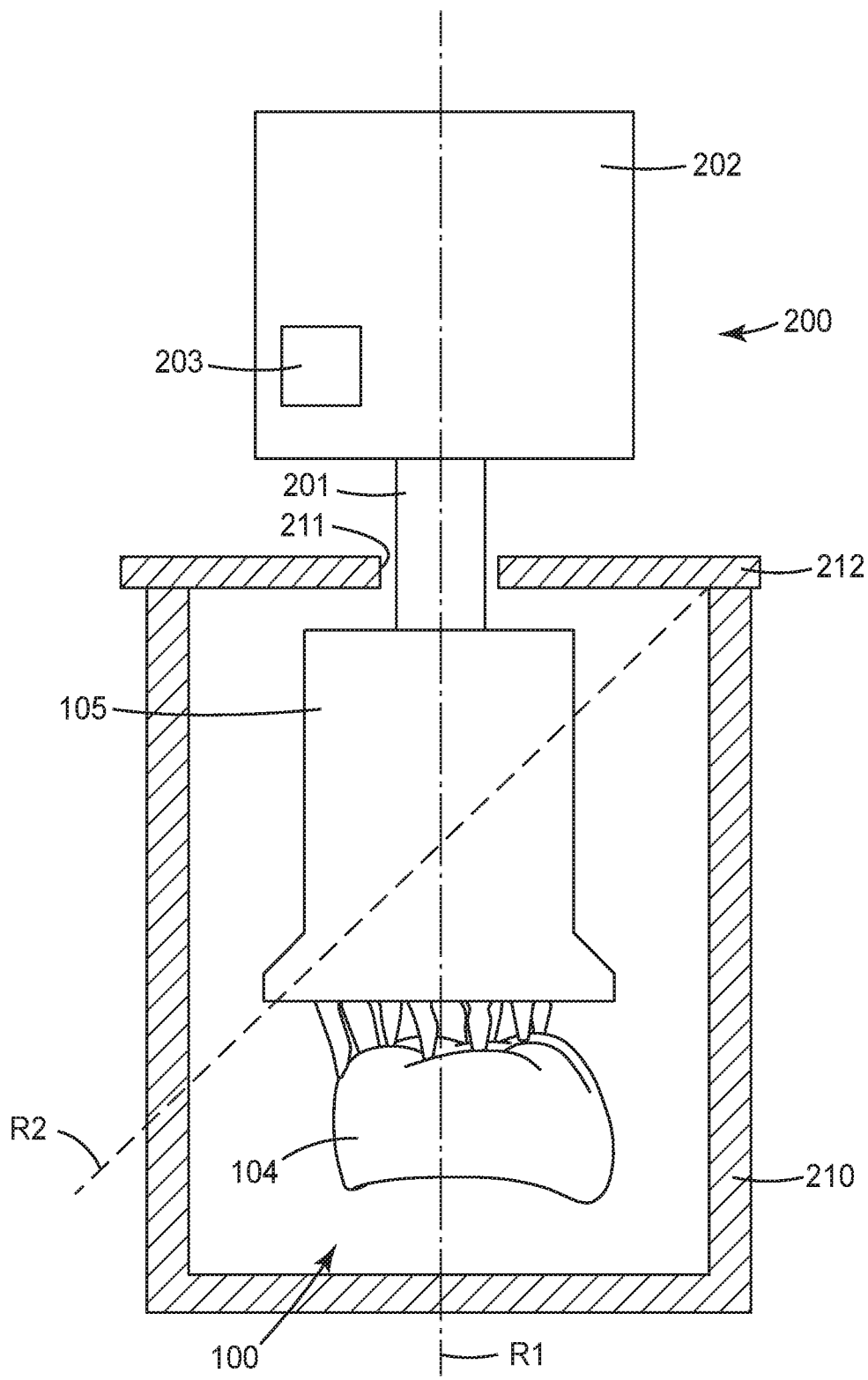
FIG. 4 is a partial cross-sectional view of an object attached on a centrifuge according to an embodiment of the invention.

FIG. 4 shows the object 100 attached on a centrifuge 200. At the stage shown the object 100 may be in two different conditions: (i) The object 100 may be built-up and not yet cleaned from excess material. In this case the centrifuge 200 is preferably used to clean the object from the excess material. (ii) The object 100 may be already be cleaned from the excess material, post-hardened and coated by a coating. In this case the centrifuge 200 is preferably used to clean the object from the coating. The centrifuge 200 has a motor driven spindle 201. In particular, the object 100 is received with the fixture portion 105 on the spindle 201, in the example by a press fit. An anti-twist structure for preventing a movement of the object 100 relative to the spindle 201 may be provided alternatively or in addition to the press fit. Further, the centrifuge 200 has a motor unit 202 for driving the spindle 201. The motor unit 202 has an electric motor (not shown) that is connected or connectable to a power source. A control unit 203 is provided as part of the centrifuge 200 or as an external unit (not shown) for adjusting the rotation speed of the motor and thus for adjusting the rotation speed of the spindle 201.

In the example the object 100 is attached on the spindle 201 for rotation about a first rotation axis R1. The first rotation axis R1 extends through the object 100. In the example the first rotation axis R1 approximates an axis of symmetry of the object. The term "approximates" addresses the fact that a dental restoration part typically replicates a natural tooth structure which is not exactly symmetric. Further, the first rotation axis R1 is parallel to the build dimension (B in FIG. 1).

The object 100 is further prepared (by the second cavity 105*b* shown in FIGS. 2 and 3) for an attachment on the spindle 201 for rotation about a second rotation axis R2 which is inclined relative to the rotation axis R1. The inclination angle between the first and second axis R1, R2 in the example is 50 degrees. Other inclination angles are possible, as appropriate. Further the second rotation axis R2 also extends through the object 100. Therefore, the object 100 can be rotated subsequently about the first and the second rotation axis R1, R2. The rotation of the object 100 in the condition (i) causes excess liquid or pasty material adhering to the object 100 to separate from the object. Alternatively the rotation of the object 100 in the condition (ii) causes the coating to separate from the object. It has been found that thus the object 100 can be physically cleaned from excess light hardenable primary material as well as from the coating. Although the cleaning effect typically does not result in 100% of the excess material and the coating to be removed from the object it has been found that about between 80% and 95% of the excess material can be removed and more than 95% of the coating can be removed. Residual excess material can be post-hardened and therefore does not affect the quality of the object. Residual portions of the coating can be easily removed, for example by washing away with water.

The cleaning effect is caused by a mass inertial force, in particular a centrifugal force that acts on the excess material or the coating. Any excess material or coating that is positioned on the first and/or second rotation axis R1 or R2 theoretically may not be effected by such centrifugal force. Further the centrifugal force exerted on any excess material or coating that is positioned close to any of the first and second rotation axis R1, R2 is lower than the centrifugal force exerted on excess material or coating being positioned farther away from the first and/or second rotation axis R1, R2. It has however been found that any impact on the cleaning effect from varying centrifugal forces can be minimized by rotating the object about at least two rotation axes (for example R1, R2).

The first and second cavity 105*b*, 105*c* are preferably positioned and oriented relative to the object 100 so that a rotation of the object about the first and second rotation axis R1, R2, respectively, of each of the first and second cavity 105*b*, 105*c* is balanced. Preferably the first and second rotation axis R1, R2 form center axes of the first and second cavity 105*b*, 105*c*, respectively. The position and orientation of the first and second cavity 105*b*, 105*c* for a balanced rotation can be determined by computer aid during the design of the object. Further, the fixture portion may be provided with additional structure and/or with voids for balancing the object for a rotation.

The rotation speed is selected in accordance to the physical properties (in particular the rheological behavior) of the excess material or the coating, one the one hand. On the other hand the rotation speed is selected in accordance to the size of the object. In the example the object 100 has a greatest diameter of about 10 mm around the first rotation axis R1. A rotation speed of approximately 6500 rounds per minute (rotated in air) has resulted in a good cleaning effect for the excess material without causing mechanical damages to the object due to forces occurring from any unbalanced mass of the object. It is noted that, the object may be built up in a way that an unbalanced mass that inherently exists due to the shape of the workpiece 104 is compensated by a counterbalance provided by the shape of the fixture portion 105. The same speed may be applied for cleaning the object 100 from the coating.

The G-force for cleaning the object 100 from excess material in this example was 236 G with respect to any points or areas at a distance (or radius) of 5 mm (10 mm diameter of the object divided by 2). There was still an excellent cleaning effect at areas of the object which had a distance or radius from the rotation axis of 2.5 mm where the G-force was still above 100 G.

The object 100 is rotated within a collecting vessel 210. This is to collect any excess material or coating ejecting from the object (and to avoid the excess material or coating from contaminating the surrounding area). The collecting vessel 210 in the example contains air (is empty). In another example a solvent may be provided in the collecting vessel for removing any excess material or coating from the object. Such a cleaning may however generally not be caused by mass inertial force and may therefore be performed in addition to the method step of the invention.

It is noted that the position and orientation of the first and second rotation axis R1, R2 can be selected otherwise.

Figure 5:
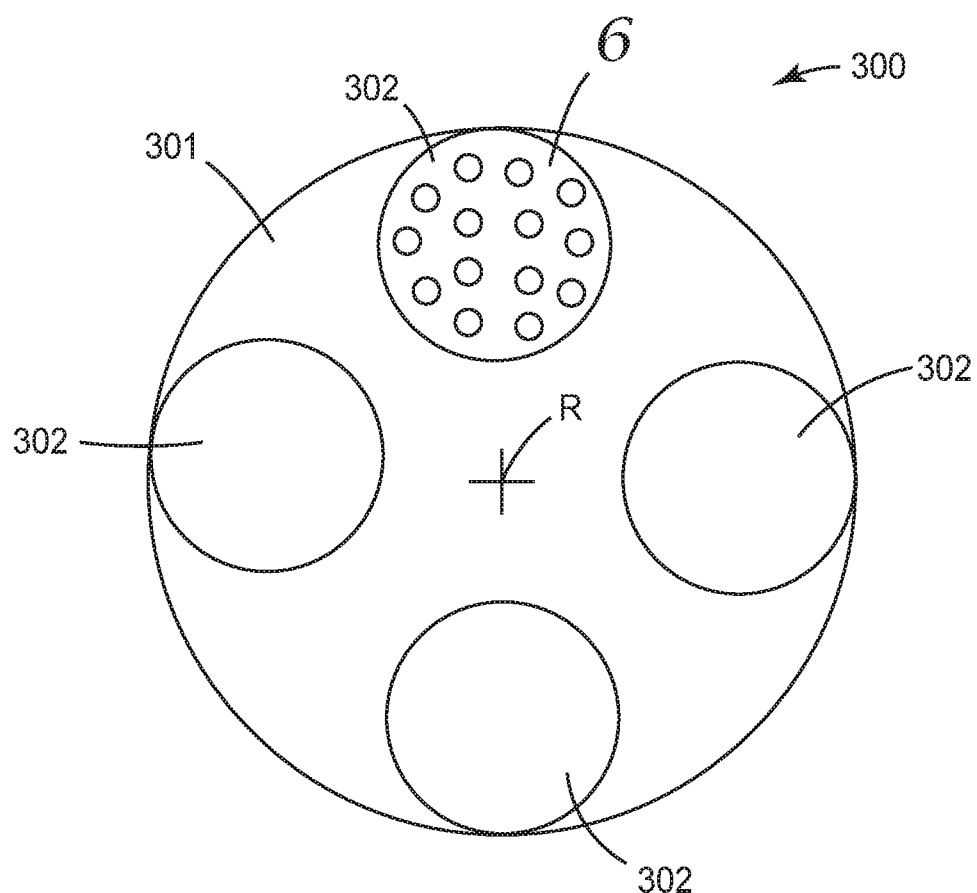
FIG. 5 is a top view on a centrifuge according to an embodiment of the invention.

FIG. 5 shows an exemplary alternative centrifuge 300. Centrifuges like the example shown or similar ones are available on the market for use in chemical or biochemical laboratories, for example. The centrifuge 300 has a rotor 301 which has four holders 302 each for accommodation of one or more samples for spinning (or centrifugalizing). The rotor 301 is rotatable about a rotation axis R by motor power at adjustable speed.

Figure 6:
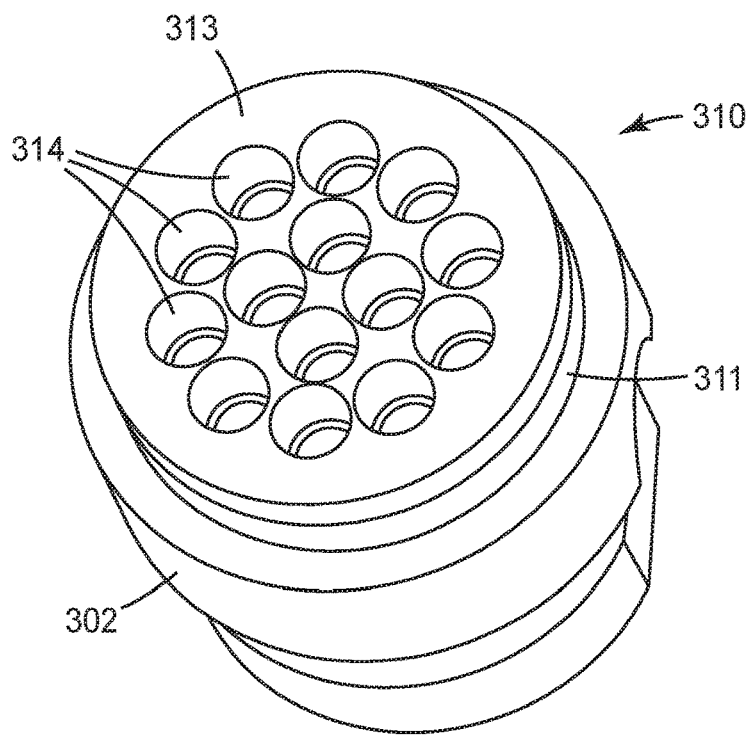
FIG. 6 is a perspective view of a tray assembly as it may be used with the present invention.
Figure 7:
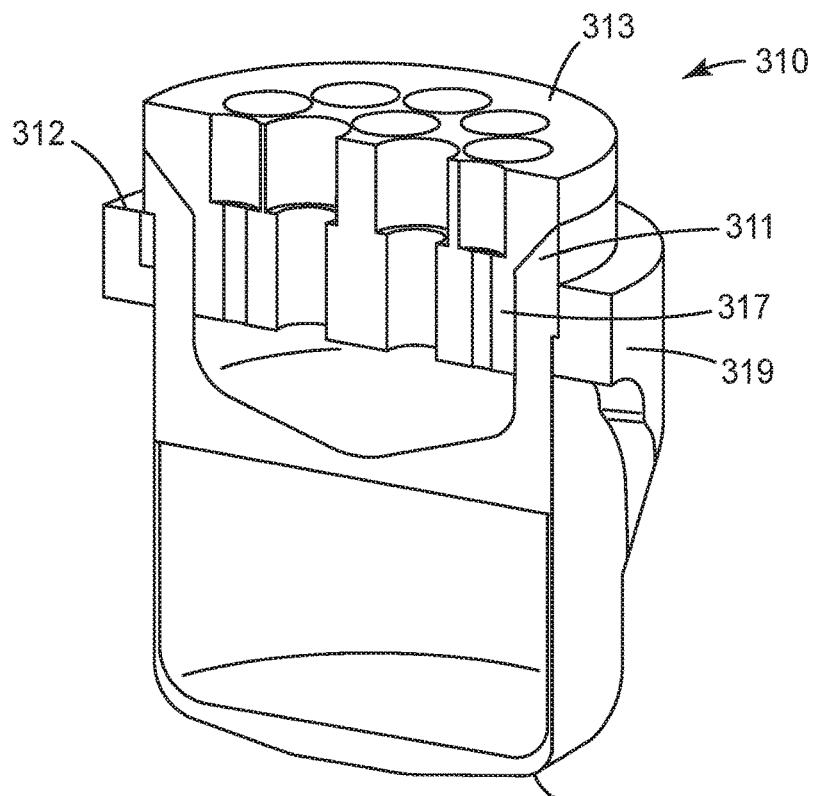
FIG. 7 is a perspective cross-sectional view of the tray assembly shown in FIG. 6.

In the example in each of the holders 302 a tray assembly 310 (which is not part of the prior art) is placed as described in more detail in FIGS. 6 and 7.

FIGS. 6 and 7 show a holder 302 in which the tray assembly 310 is received. The holder 302 has a top end 319 and a bottom end 318. Further, each holder 302 has a longitudinal axis A in a dimension of the holder 302 between the top end and the bottom end. The holder 302 is rotatably suspended (not illustrated in this view) at the rotor (301 in FIG. 5). The holder 302 is suspended at the rotor adjacent the top end of the holder 302 for a rotation radially of the rotation axis (R in FIG. 5). Thus, in operation of the centrifuge 300 the holders 302 tilt with their bottom ends 318 radially outwardly in consequence of a centrifugal force caused by the rotation of the rotor of the centrifuge. The tilting can be imagined like the radial movement of the chairs of a chairoplane. If the rotation speed of the rotor is zero the holders 302 are oriented with their longitudinal axes A vertical (essentially in line with the force of gravity). The higher the rotation speed of the rotor, the more incline the holders 302 with the longitudinal axis A approximating a radial direction of the rotation axis. The holder 302 in the example is cup-shaped and forms an opening 312 (see FIG. 7) at the top end 319. Further the holder 302 is closed on the bottom end 318. Thus any substance that escapes from centrifuged objects can be captured within the holders and contamination of the centrifuge can be prevented. The skilled person will however understand that the holder may have different shapes depending on the type of centrifuge used.

The tray assembly 310 is received within or on the opening 312 of the holder 302. In the example the tray assembly 310 comprises a tray 313 and a collecting vessel 315. The collecting vessel 315 is cup-shaped and forms a socket 317 in which the tray 313 is received. Therefore, excess light hardenable primary material or coating that is centrifuged away from objects received in the tray 313 is captured within the collecting vessel 315. This allows for replacing the whole tray assembly 310—including any centrifuged objects and the removed light hardenable primary material or coating—by a new tray to be centrifuged. The holders thereby can be kept clean so that a mass production is enabled through replaceability of the tray assemblies and the absence of maintenance breaks for cleaning the holders.

It is noted that, although not preferred, in another example a similar tray may be received directly in the holder 302.

Figure 8:
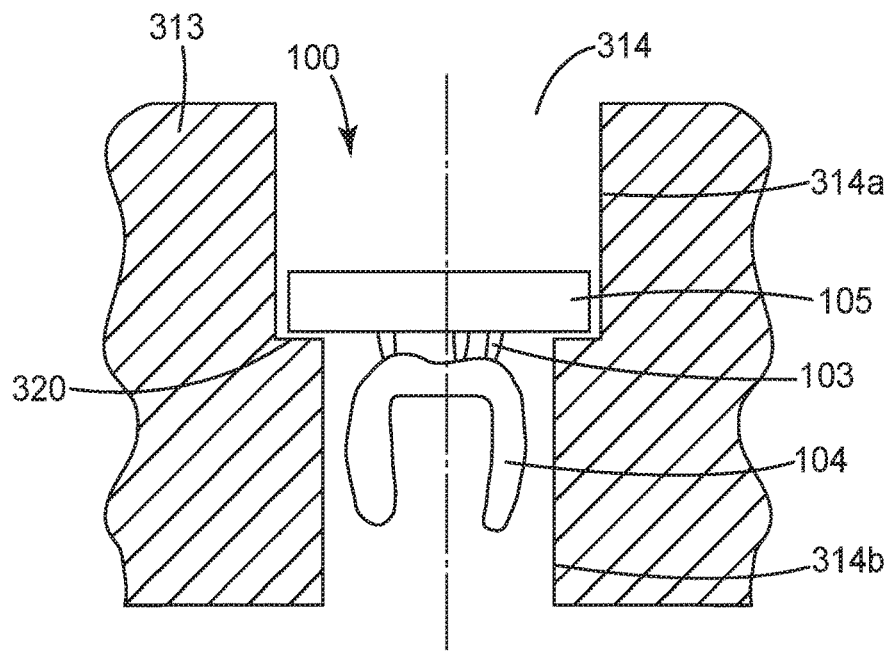
FIG. 8 is a partial perspective view of a tray as it may be used with the present invention.

The tray 313 has a plurality of receptacles 314. Each of the receptacles 314 in the example forms a through-hole. The receptacle 314 is shaped and sized so that a built up object 100 can be received and retained therein as shown in FIG. 8.

In the example the through-hole in the tray 313 has a stepped configuration with the step 320 providing a retainer that retains the object 100 and prevents the object 100 to pass through the through-hole. The step 320 is formed by a transition between a first portion 314a and a second portion 314b of the through-hole of the receptacle 314. The first portion 314a is wider in cross-section than the cross-section of the second portion 314b. In the example the first and second portion 314a, 314b are cylindrical and a first cross-section of the first portion 314a has a greater diameter than a second cross-section of the second portion 314b. The object 100 corresponds to the object referred to in FIGS. 2 and 3 and therefore comprises a workpiece 104 connected via support structures 103 to a fixture portion 105. The object 100 is placed with the workpiece 104 downwards (toward the center of gravity) into the receptacle 314. The fixture portion 105 is greater in size than the workpiece 104 and dimensioned to fit in the first portion 314 a. Accordingly the fixture portion 105 is positioned in the first portion 314a of the receptacle and the remainder of the object 100 protrudes in (or through) the second portion 314b of the receptacle.

In one example (not shown) one fixture portion may carry a plurality of (eventually different) workpieces. In this example a tray may have one or more larger receptacles (compared to the receptacles for receiving object with one workpiece only).

Figure 9:
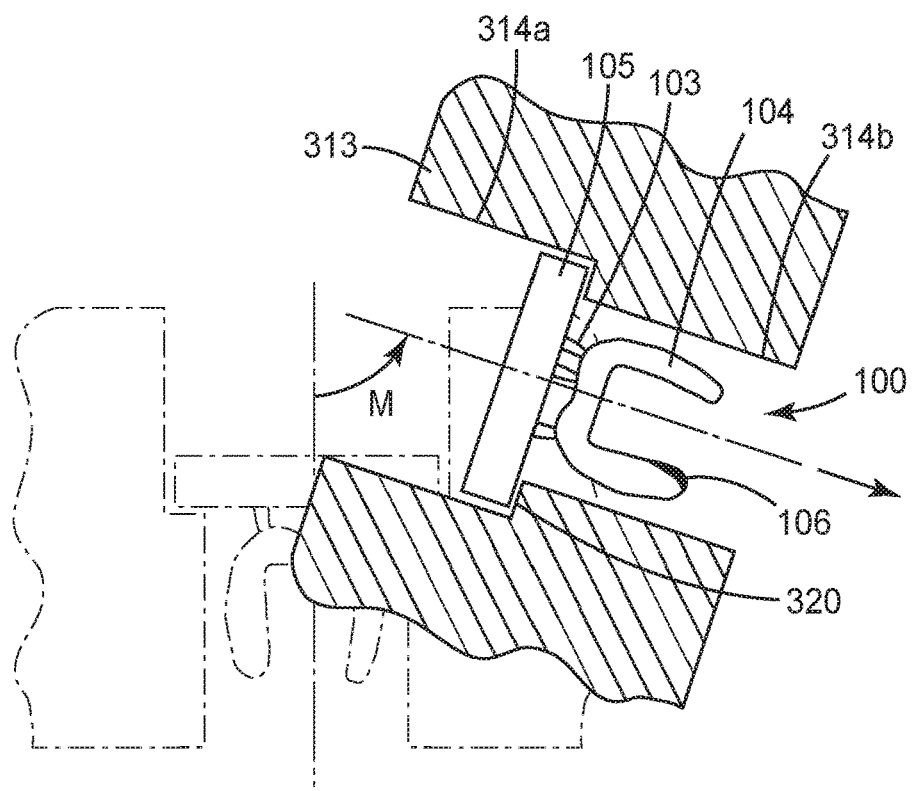
FIG. 9 is a partial perspective view of the tray of FIG. 8 in operation of a centrifuge in which the tray is used.

In FIG. 9 the movement M of a holder and thus of the tray 313 is indicated during centrifuging. In consequence of the rotation of the rotor of the centrifuge the tray 313 inclines due to a centrifugal force. Depending on the rotation speed of the rotor and the weight of the holder including the tray the inclination of the tray establishes due to a resulting force F of the centrifugal force and the weight. It has been found that the removal of excess material or coating from a workpiece forming an undercut (like the undercut 106 indicated in the Figure) can be facilitated by adjusting of the inclination of the workpiece, and that the inclination of the workpiece can be adjusted by the rotation speed of the centrifuge. Further, because the weight of the holder including the tray and the object can be determined already during the design of the object it has been found that the desired rotation speed (that also accounts for undercuts of the workpiece) can be predetermined before centrifuging (for example during the design of the object).

In this regard it is noted that any cavity in an object may form an undercut depending on an orientation of the cavity relative to a resulting force acting on the object in a centrifuge. Therefore an object may be successively centrifuged at different speeds to remove excess material or the coating from different undercuts. The tray, loaded with a particular object, may therefore be provided with a data carrier, for example a printed label or a RFID tag, in which data about the rotation speed or speeds is stored. The centrifuge may have a reading device for the data carrier for automatically running a centrifuging program in accordance to the data read from the data carrier.

What is claimed is:

1. A method of making a physical object by additive manufacturing, the method comprising:
   providing a light hardenable primary material, wherein
   the light hardenable primary material is liquid or pasty;

building up the object by successively hardening portions of the light hardenable primary material by irradiating the portions with light;

coating at least a part of the object with a flowable coating; and irradiating the coated object with light and thereby post-hardening any light hardenable primary material, the method further comprising a step of cleaning the object from the coating by generating a mass inertial force in the coating by rotating the object, wherein the rotation is performed about at least a first rotation axis and a second rotation axis, wherein the first rotation axis and the second rotation axis have different orientations, wherein at least some of the coating is separated from the object due to the mass inertial force generated during rotation.

2. The method of claim 1, wherein cleaning the object comprises separating at least 80% of the coating from the object during rotation of the object.

3. The method of claim 1, further comprising cleaning the object from excess material by generating a mass inertial force in the excess material and separating at least some of the excess material from the object, wherein the step of cleaning the object from excess material is performed before the step of coating the at least a part of the object with a coating, and wherein the excess material is formed by at least one of the light hardenable primary material and a light hardenable secondary material.

4. The method of claim 3, wherein the mass inertial force generated in the excess material, the coating, or both is a centrifugal force.

5. The method of claim 1, wherein the object comprises a workpiece for providing a dental restoration from the object.

6. The method of claim 5, wherein the object further comprises a fixture portion that does not form part of the dental restoration, wherein the fixture portion is configured for retaining the object in a post-processing device for cleaning the object.

7. The method of claim 1, wherein the coating comprises a flowable light permeable oxygen protective material.

8. The method of claim 7, wherein the coating comprises a glycerol-based gel.

9. The method of claim 8, wherein the coating is made of a composition comprising between 50% by weight and 99% by weight glycerol and between 1% by weight and 49% by weight fumed silica.

10. The method of claim 1, wherein generating a mass inertial force in the coating comprises generating a mass inertial force of at least 100 G.

11. The method of claim 1, wherein at least 95% of the coating is separated from the object as a result of the rotation.

12. The method of claim 3, wherein at least 95% of the excess material is separated from the object as a result of the rotation.

* * * * *